Patented Feb. 14, 1950

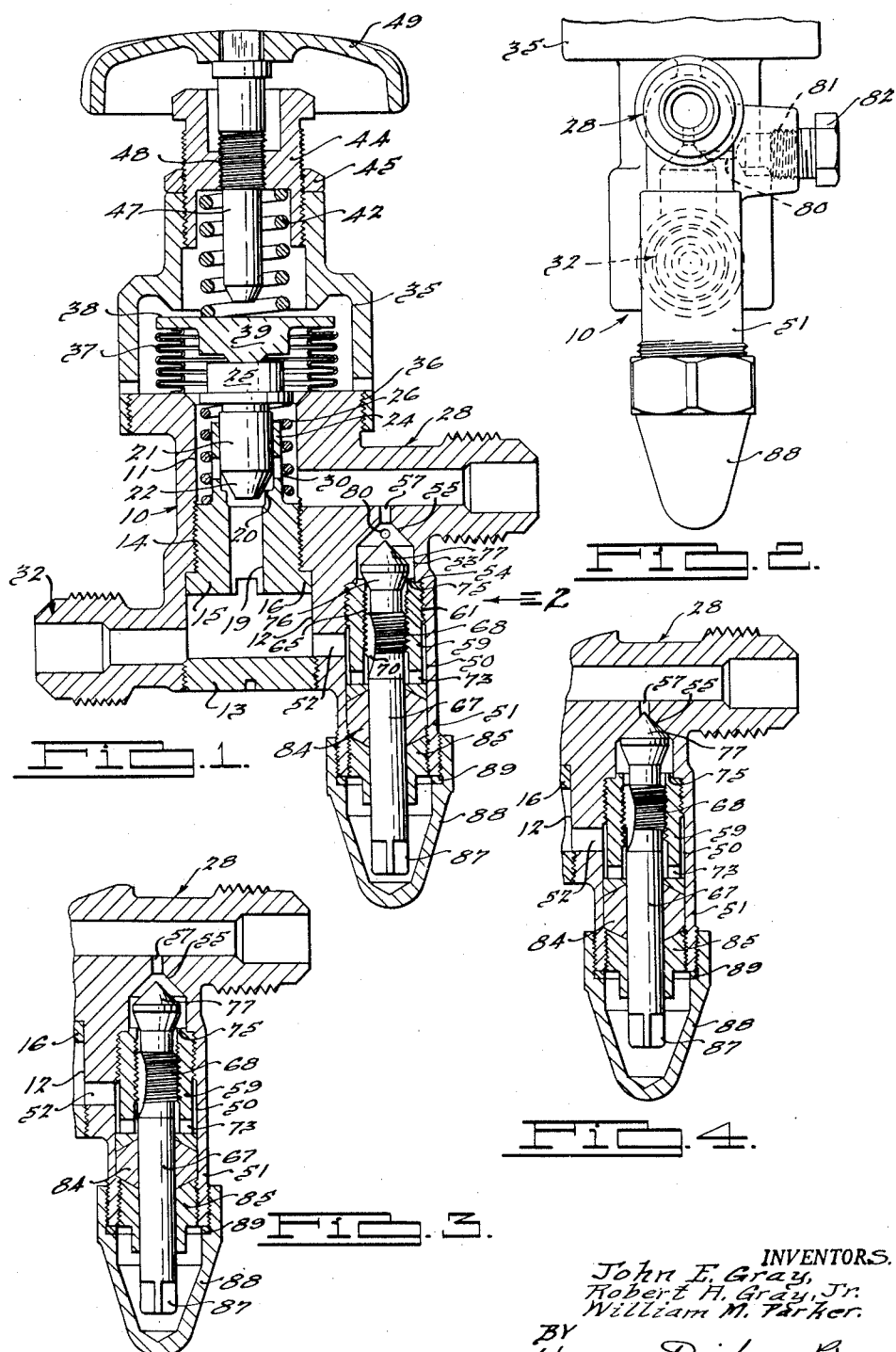

2,497,664

UNITED STATES PATENT OFFICE

2,497,664

PRESSURE CONTROL VALVE

John E. Gray, Robert A. Gray, Jr., and William M. Parker, Port Huron, Mich., assignors to Mueller Brass Co., Port Huron, Mich., a corporation of Michigan Application June 19, 1946, Serial No. 677,754

9 Claims. (Cl. 277—54)

The invention relates to a valve and it has particular relation to a pressure regulated type of valve adapted for use in connection with refrigerating systems.

While the invention may have various applications, it is especially designed for use in refrigerating systems having a plurality of evaporators to be maintained at different temperatures by controlling the pressure in the evaporator coils. Heretofore, valves have been employed for this purpose and one particular type of valve that has so been employed includes a valve body having a pressure responsive bellows which closes when the pressure in the evaporator coil is reduced to a predetermined pressure and which opens when the pressure increases to a higher predetermined pressure. By means of adjustable features included in the valve, such predetermined pressures may be varied so as to determine the operating temperature of the evaporator. However, in the operation of systems of this type, it may be necessary from time to time to evacuate the evaporator and it is evident that a valve which closes when the pressure is reduced to a predetermined amount will interfere with the evacuating process.

The present invention is principally concerned with the provision of a valve for adjustably controlling the pressure and, therefore, temperature of the evaporator while still permitting evacuation of the evaporator without any interference such as stated. Generally this is accomplished by providing a by-pass having an auxiliary valve which can be opened for evacuating the evaporator and at other times held in closed position so that the main valve operates for controlling the temperature in the usual manner. Additionally, the invention provides a means for connecting a pressure gauge to the by-pass so as to determine the pressure in the evaporator during the process of evacuating the latter or at any other time when it is desired to determine such pressure. This means for connecting the pressure gauge is so related to the auxiliary valve that the gauge may be connected and disconnected without loss of refrigerant.

One object of the invention, therefore, is to provide in a valve such as generally indicated, a controllable by-pass means which permits evacuating the evaporator independently of the pressure responsive valve normally controlling the temperature of the evaporator.

Another object of the invention is to provide a valve such as indicated, wherein the by-pass has auxiliary valve means and a pressure gauge connection and wherein the parts are so arranged that the pressure gauge connection may selectively be opened or closed with respect to the evaporator either with the by-pass closed to the suction line or with the by-pass open to such line.

Another object of the invention is to provide a valve of this character having auxiliary valve means in the by-pass wherein the pressure gauge connection can be completely closed so as to enable connecting and disconnecting the pressure gauge with respect to the by-pass without loss of refrigerant.

Another object of the invention is to provide a valve of the general character described wherein the parts can be manufactured and assembled efficiently without introducing undesirable costs in the construction.

Other objects of the invention will become apparent from the following specification, from the drawings relating thereto, and from the claims hereinafter set forth.

For a better understanding of the invention, reference may be had to the drawings wherein:

Figure 1 is a vertical cross-sectional view of a valve constructed according to one form of the invention.

Figure 2 is a fragmentary side elevational view as seen in the direction of the arrow 2 in Figure 1.

Figure 3 is a fragmentary view in cross-section showing the auxiliary valve in the by-pass in its intermediate position.

Figure 4 is a view similar to Figure 3 illustrating the auxiliary valve in its upper, closed position.

Referring to Figure 1, the valve comprises a body 10 having a vertically extending passage or opening 11 which is enlarged at its lower end as indicated at 12. This enlarged portion 12 of the opening is closed at its lower end by a threaded plug 13. Above the larger portion 12 of the opening 11, a wall of the opening is threaded as indicated at 14 and receives a threaded bushing 15 having an annular shoulder 16 engaging the junction between the smaller and larger portions of the opening. This bushing has a central opening 19 and at the upper end of the opening an annular valve seat 20 is provided which is adapted to be closed by a valve stem 21 having a frustoconical end 22 adapted to engage the seat. For slidably guiding the stem, the bushing has a sleeve-like integral extension 24 which receives the stem.

At its upper end the stem 21 has a head 25 which is urged upwardly by a coil spring 26 encircling the extension 24 and abutting the base of the bushing around the lower end of the extension. This spring normally urges the valve stem 21 to a valve open position. The valve body is provided with an inlet 28 adapted to be connected to an evaporator in the refrigerating system and this inlet communicates with the space around the extension 24 and also with the inside of the extension by ports 30 in the latter. Fluid flowing through the inlet can thus flow downwardly through the bushing when the valve stem is raised. An outlet 32 on the body communicates with the enlarged part 12 of the opening 11 and such outlet is adapted to be connected to a suction line leading to the refrigerator pump.

Above the valve stem 21, a cap 35 is threaded onto the valve body as indicated at 36 and this cap houses a bellows 37 having an upper end wall 38 provided with a head 39 on its lower side which abuts the head 25 on the valve stem. The space within the bellows is in communication with the upper end of the opening 11 and, consequently, the fluid in the inlet 28 also is present in the bellows. Above the bellows, a heavy coil spring 42 is provided which engages the end wall 38 and acts to hold the valve closed unless the pressure acting upwardly against the end wall 38 becomes sufficient to open the bellows and in that event the coil spring 26 raises the valve stem from its seat. The heavier coil spring 42 engages at its upper end a bushing 44 threaded into the cap 35 and it is evident that by adjusting the bushing, loading on the spring may be varied and, hence, the pressure at which the valve will open may be varied. A lock nut 45 on the bushing acts to hold it in any position.

For the purpose of manually locking the valve in its closed position whenever this may be desired, a stem 47 is threaded through the bushing as indicated at 48 and this stem has a hand wheel 49 on its upper end. When the hand wheel is turned sufficiently, the end of stem 47 will press against the end wall 38 of the bellows and in this way the valve stem 21 may be moved to and locked in its valve closing position.

It should be evident from the foregoing description of the valve that normally fluid under pressure in the inlet 28, and hence, fluid under pressure in the evaporator, will govern the opening and closing of the valve stem 21 so that the valve will open when the pressure reaches a predetermined amount and will close when the pressure is reduced to a predetermined amount. Thus temperature conditions of the evaporator may be maintained and also adjusted if desired.

As stated previously, it is desirable, from time to time, in the use of a valve of this character, to evacuate the evaporator and in accomplishing this result by means of the present invention, a by-pass is provided between the inlet 28 and outlet 32 which operates independently of the main valve. This by-pass includes a vertically extending opening 50 formed in an extension 51 of the valve body which is in communication with the enlarged opening 12 by means of a port 52. At its upper end the opening 50 joins an opening 53 of slightly smaller diameter so as to provide a shoulder 54 between such portions of the opening and the smaller portion 53 in turn joins a frusto-conical seat 55. This frusto-conical seat leads to a port 57, in turn communicating with the inlet 28.

A sleeve type bushing 59 is threaded into the upper end of the opening 50 as indicated at 61 and abuts the shoulder 54. The lower portion of the bushing is of reduced outside diameter so as to provide clearance between its outer wall and opening 50 and such clearance space is in communication with the port 52. The bushing 59 is internally threaded as indicated at 65 and receives a valve stem 67 which has an enlarged threaded portion 68 engaging the threads of the bushing. Below and above the threads 68 the valve stem is of reduced diameter and in order to provide fluid communication between such reduced portions, a slot 70 is formed axially through the threaded portion. It might be observed at this time that the lower end of the bushing has one or more openings 73 so that fluid may downwardly flow through the bushing, then through openings 73 and then upwardly to the port 52.

The upper end of the bushing 59 is formed with a valve seat 75 which is adapted to engage a frusto-conical head portion 76 on the upper end of the stem 67. Such stem has an oppositely arranged frusto-conical head portion 77 above the portion 76 and this portion is adapted to engage the frusto-conical seat 55 when the stem is moved upwardly. It should be evident from the description so far given that the stem in its upper portion, as shown by Figure 4, will close the by-pass and also that it will close the by-pass when in its lower position as shown in Figure 1. Within the margins of the seat 55 a port 80 communicates with the by-pass and this port, as best shown by Figure 2, leads to a threaded opening 81 which normally may be closed by a plug 82. This threaded opening is particularly adapted for connection with a pressure gauge which may be connected thereto upon removal of the plug.

For sealing the lower end of the bushing 59 and the lower end of the stem 67, a packing 84 is provided around the stem and this packing is compressed against a washer at the lower end of the bushing by a packing nut 85 threaded into the lower end of the opening 50. The stem 67 projects below the nut 85 and has a square end 87 so that it may be readily turned. A cap 88 threaded on the lower end of the extension 51 covers the lower end of the stem and at the same time additionally acts as a sealing means and preferably a gasket 89 is provided between this cap and the end of the extension.

Normally, when the valve is in operation, the stem 67 will be in its upper position as seen in Figure 4 and in this position the by-pass is closed and the gauge port 80 is disconnected both from the outlet and the inlet ends of the by-pass. In the event it is desired to evacuate the evaporator, the valve stem 67 is moved to its intermediate position shown in Figure 3 and then continued operation of the pump will cause desired evacuation of the evaporator. If desired, a gauge may be connected to the threaded opening 81 prior to this procedure so that pressure conditions may be observed. At other times, if it should be desired to check pressure conditions in the evaporator or in the event adjustment is desired, the valve stem can be moved to its lower position as seen in Figure 1 and this connects the gauge opening to the evaporator but disconnects it from the suction line. It is evident that the gauge can be connected and disconnected with the valve stem in its upper closed position so that no refrigerant escapes while connecting and disconnecting the gauge. The invention altogether provides an arrangement which permits evacuating the evaporator and making any and all adjustments and checks considered necessary without removing any parts or requiring use of additional connections at the outlet end of the evaporator.

Although only one form of the invention has

We claim:

1. A valve comprising a valve body having an inlet passage and an outlet passage, valve means in the body between the inlet and the outlet passages for controlling the flow of fluid through the valve, means providing a by-pass between the inlet and outlet passages and around the valve means, port means communicating with the by-pass and adapted to be connected to a gauge or the like, and auxiliary valve means for selectively closing the by-pass to either of said passages and for isolating said port from both of the latter passages.

2. A valve comprising a valve body having an inlet passage and an outlet passage, valve means in the body between the inlet and the outlet passages for controlling the flow of fluid through the valve, means providing a by-pass between the inlet and outlet passages and around the valve means, port means communicating with the by-pass and adapted to be connected to a gauge or the like, and auxiliary valve means for selectively opening the by-pass to both the inlet and outlet passages or for opening one of the latter passages to said port or for closing the by-pass and port to both passages.

3. A valve comprising a valve body having an inlet passage and an outlet passage, valve means in the body between the inlet and the outlet passages for controlling the flow of fluid through the valve, means providing a by-pass between the inlet and outlet passages and around the valve means, port means communicating with the by-pass and adapted to be connected to a gauge or the like, and auxiliary valve means for selectively opening the by-pass to both the inlet and outlet passages or for closing the by-pass and port to both passages.

4. A valve comprising a valve body having inlet and outlet passageways, valve means in the body between the inlet passageway and outlet passageway for controlling the flow of fluid through the valve, means providing a by-pass between the inlet and outlet passageways and around the valve means, port means opening into said by-pass and adapted for communicatively connecting said by-pass with an external fluid conduit, and auxiliary valve means including a valve element movable selectively between two positions in either of which the by-pass is closed to one of said passageways and in one of which positions said port means is closed to said by-pass and into a third position in which the by-pass is open to both of said passageways whereby said conduit may be communicatively connected to one or both of said passageways.

5. A valve comprising a valve body having an inlet and outlet, valve means in the body between the inlet and outlet for controlling the flow of fluid through the valve, means providing a by-pass between the inlet and outlet and around the valve means, auxiliary valve means in the by-pass and including a movable valve stem having spaced valve heads, and a pair of valve openings adapted respectively to be engaged by the valve heads depending upon selective movement of the stem, and port means communicating with said by-pass through a wall of one of said valve openings.

6. A valve comprising a valve body having an inlet and outlet, valve means in the body between the inlet and outlet for controlling the flow of fluid through the valve, means providing a by-pass between the inlet and outlet and around the valve means, valve means in the by-pass for opening and closing it, and port means communicating with the by-pass and adapted to be connected to a gauge or the like, said port means being so located that it is closed to the by-pass when the last-named valve means is in one position and is open to the by-pass when the last-named valve means is in another position.

7. A pressure controlled valve comprising a valve body having inlet and outlet passages, valve means in the body between the inlet and outlet passages for controlling the flow of fluid through the valve, pressure responsive means controlled by the pressure in one passage for opening and closing the valve, manually operable means for closing the valve independently of the pressure means, means providing a by-pass between the passages and around the valve means, and auxiliary valve means in the by-pass for opening and closing the latter.

8. A pressure controlled valve comprising a valve body having inlet and outlet passages, valve means in the body between the inlet and outlet passages for controlling the flow of fluid through the valve, pressure-reponsive means controlled by the pressure in one passage for actuating the valve, means for adjustably determining the pressure at which said pressure-responsive means actuates said valve, manually operable means for closing the valve while maintaining said adjustably determining means at its adjusted condition, means providing a by-pass between the passages and around the valve means, and auxiliary valve means in the by-pass for opening and closing the latter.

9. A valve comprising a valve body having an inlet and an outlet, valve means in the body between said inlet and outlet for controlling flow of fluid through said inlet and said outlet, means providing a by-pass between said inlet and said outlet and around said valve means, said by-pass having a pair of spaced valve seats, one of said seats being of substantially frusto-conical form, auxiliary valve means in said by-pass and including a movable valve stem having spaced valve heads, one of said heads having a section of substantially conical form and adapted to engage said one seat, the other of said heads being engageable upon movement of said valve stem with the other of said seats, and port means opening through one wall of said one seat whereby when said one valve head is in engagement with said one seat said port means is closed to fluid flow from said by-pass.

JOHN E. GRAY.
ROBERT A. GRAY, Jr.
WILLIAM M. PARKER.

REFERENCES CITED

The following references are of record in the file of this patent:

UNITED STATES PATENTS

| Number | Name | Date |
| --- | --- | --- |
| 1,491,241 | Kindervater | Apr. 22, 1924 |
| 1,630,741 | Griffiths | May 31, 1927 |
| 2,062,857 | Askin | Dec. 1, 1936 |